UNITED STATES PATENT OFFICE.

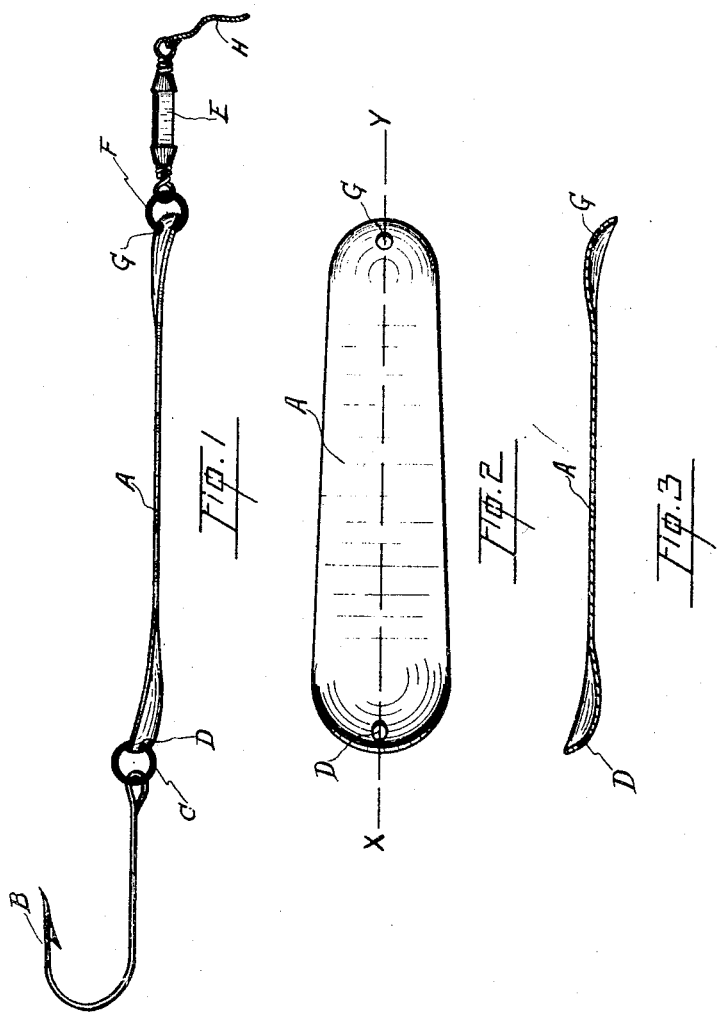

WILLIAM SELIG, OF PRINCE RUPERT, BRITISH COLUMBIA, CANADA.

FISHING-BAIT.

1,115,743.  Specification of Letters Patent.  Patented Nov. 3, 1914.

Application filed October 27, 1913. Serial No. 797,531.

*To all whom it may concern:*

Be it known that I, WILLIAM SELIG, a subject of the King of Great Britain, and a resident of the city of Prince Rupert, in the Province of British Columbia, Canada, have invented certain new and useful Improvements in Fishing-Baits, of which the following is a specification.

My invention relates to improvements in fishing baits, with more particular reference to artificial baits for trolling purposes, and the object of my invention is to devise a fishing bait which will troll straight and with a steady motion, instead of jumping and turning in the water as other trolls do.

The ordinary method of trolling is well known, and, briefly stated, consists simply in pulling the bait through the water, when, the fish, being attracted thereto, may seize the bait and be hooked thereby. The ordinary troll, however, as constructed at the present time, turns or jumps too much in the water as it is being operated, with the result that the fish will often miss the troll altogether, or will only be slightly hooked and thus be able to shake off the bait. To overcome this disadvantage I have devised a troll with which the fish are nearly all hooked down in the throat, due to being able to strike them much harder on account of the steadier motion of the troll, this steady motion being obtained by the particular construction of the troll spoon, as illustrated in the accompanying drawings in which—

Figure 1 is an elevation of my troll, showing an edge view of the spoon. Fig. 2 is a plan view of the spoon. Fig. 3 is a longitudinal sectional elevation of the spoon on the line X—Y in Fig. 2.

Similar letters of reference indicate similar parts throughout the several views.

A is the spoon portion of my bait.

B is the hook.

C is a ring connecting the hook B to one end of the spoon A, the connection being made through the hole D. E is a swivel connected to the other end of the spoon, the connection being made through the hole F.

G is the trolling line, which is secured to the outer end of the swivel E.

My bait may be made of any size and of any suitable material, and can be used for all kinds of fish. In construction, instead of forming the portion A spoon shape for its entire length, as in other trolls, I form it as shown in Figs. 1, 2, and 3. That is, the ends only of the portion A are formed spoon shape, and one end is turned upwardly and the other end is turned downwardly, while the intervening portion of A is made perfectly flat and straight, so that the longitudinal section of the complete spoon is as shown in Fig. 3. I find that a troll having its spoon formed in this manner will troll straight and with a much steadier motion than can be obtained with other forms of trolls in which the spoon is formed as a complete spoon and without any flat straight portion. It will be seen, therefore, that I have devised a fishing bait for trolling purposes, which will troll straight through the water and with a much steadier motion than is obtainable with the present forms of trolls, and on account of which steadier motion, by striking the fish much harder, the fish will be hooked down in the throat, instead of, as frequently happens at the present time, their missing the bait altogether or only being slightly hooked, due to the present forms of trolls jumping or turning too much in the water when being operated.

What I claim as my invention is—

1. In a fishing bait for trolling purposes, the combination with a hook and a swivel attachment, of an artificial bait member disposed between the hook and the swivel attachment, said member having substantially reversely set spoon shaped ends and a flat straight intervening portion therebetween, as and for the purpose specified.

2. In a fishing bait for trolling purposes, an artificial bait member comprising a flat stright body portion, and reversely set substantially spoon shaped ends, and adapted to be connected at the ends to the hook and line, as and for the purpose specified.

Dated at Prince Rupert, B. C., this 9' day of October, 1913.

WILLIAM SELIG.

Witnesses:
JOSEPH WALSEBY SCOTT,
CHALS. WALLACE.